United States Patent [19]
Williams

[11] Patent Number: 4,965,762
[45] Date of Patent: Oct. 23, 1990

[54] MIXED SIZE RADIX RECODED MULTIPLIER

[75] Inventor: Tim A. Williams, Austin, Tex.

[73] Assignee: Motorola Inc., Schaumburg, Ill.

[21] Appl. No.: 407,828

[22] Filed: Sep. 15, 1989

[51] Int. Cl.[5] .............................................. G06F 7/52
[52] U.S. Cl. ................................................... 364/760
[58] Field of Search ............................... 364/759, 760

[56] References Cited

U.S. PATENT DOCUMENTS

| | | | |
|---|---|---|---|
| 4,153,938 | 5/1979 | Ghest et al. | 364/760 |
| 4,546,446 | 10/1985 | Machida | 364/759 |
| 4,745,570 | 5/1988 | Diedrich et al. | 364/760 |
| 4,807,175 | 2/1989 | Tokumaru et al. | 364/760 |
| 4,864,528 | 9/1989 | Nishiyama | 364/754 |

Primary Examiner—Gary V. Harkcom
Assistant Examiner—Tan V. Mai
Attorney, Agent, or Firm—Robert L. King

[57] ABSTRACT

An array multiplier utilizing a predetermined recoding algorithm minimizes operating speed by using two different radices. Special product terms must be formed to implement the recording algorithm. In order to avoid delaying the computation of partial products until after the time special products are formed, two recoding radices may be used. Partial products can be calculated from terms formed by a smaller sized radix during the same time the special product terms are being calculated. Initial use of the smaller radix eliminates an immediate need for the special product bits which improves multiplier speed by minimizing time required to form a final product.

15 Claims, 2 Drawing Sheets

-PRIOR_ART-

MIXED SIZE RADIX RECODED MULTIPLIER

TECHNICAL FIELD

This invention relates to binary multibit multipliers, and more particularly, to electronic multipliers which use recoding algorithms.

BACKGROUND OF THE INVENTION

It is well known that as digital multipliers are implemented vor very large operand bit sizes, the complexity, speed of operation and size of circuitry become very large problems. These factors are the primary limitations preventing fast, powerful large-scale integrated multipliers from being commonly used. Others have commonly sought to solve the multiplier size problem by reducing the number of additions required to implement a multiplication operation. Recoding of the binary inputs in accordance with a recoding algorithm such as Booth's algorithm, Modified Booth's algorithm or further Modified Booth's algorithm significantly reduces the number of additions required. Recording schemes typically utilize bit pair recoding meaning that two bits of a binary input are grouped together to require only one addition of an input operand, typically labeled "X", rather than an addition for each bit of the input operand. Recoding schemes larger than bit pair recoding have been used but have the associated disadvantage of introducing further complexity. An example of a recoding multiplier which uses four bit recoding is illustrated by Diedrich et al. in U.S. Pat. No. 4,745,570 entitled "Binary Multibit Multiplier". Diedrich et al. teach a multiplier which uses five adder carry chains to perform a sixteen by N multiply, where N is an integer. The Diedrich et al. multiplier uses five bit groupings for the recoders and form the required X3, X5 and X7 "special product" terms of operand "X" before permitting the addition associated with the first recoding to proceed. Therefore, four adder carry delays due to each of the four recoders exist in addition to a carry delay due to the formation of the special product terms. The speed of the multiplier is directly related to the total number of carry delays.

SUMMARY OF THE INVENTION

Accordingly, it is an object of the present invention to provide an improved multiplier which minimizes carry delays.

Another object of the present invention is to provide an improved method and apparatus for performing multiplication with a predetermined recoding algorithm by using mixed radix sizes.

It is yet another object of the present invention to provide an improved method and apparatus for improving speed in a multiplier circuit which uses a recoding algorithm.

A further object of the present invention is to provide an improved recoded multiplier which uses two or more radices.

In carrying out the above and other objects of the present invention, there is provided, in one form, a mixed size radix recoded multiplier using a predetermined recoding algorithm to provide a product of first and second input operands. The multiplier recodes a predetermined one of the input operands by using at least two radices to group the predetermined input operand into a plurality of groups of bits. Each group of bits has a bit size corresponding to one of first or second radices. The multiplier forms special product terms which are required by adder circuits to form partial product terms using bits associated with the second radix. Substantially concurrently, a partial product term is formed using bits associated with the first radix. The first radix has an integer size which is less than the integer size of the second radix.

These and other objects, features, and advantages, will be more clearly understood from the following detailed description taken in conjunction with the accompanying drawings.

DETAILED DESCRIPTION OF THE INVENTION

Figure 1A:
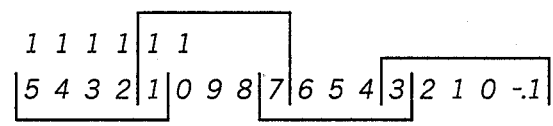
FIG. 1(A) is a known graphical representation illustrating bit groupings of a single radix recoding algorithm.

Shown in FIG. 1(A) is a graphical representation of the bit positions for a binary coded input word which is recoded in accordance with a recoding algorithm such as Booth's algorithm, Modified Booth's algorithm or variations thereof. In the illustrated form, the recoding is implemented in four groups of five bits each. The numbers illustrated represent the exponent of the powers of two. Hence, a radix of five is implemented. In the particular illustrated form, after the bit labeled "nine", a carry bit is placed above each successive following bit to accomodate sign extension. The right-most bit of the right-most group, i.e. $2^{-1}$, is always a binary zero. An overlap of one bit occurs between each group. The recoding scheme which is used simplifies the multiplication of the recoded number with a second operand by reducing the number of rows of adder circuits in an array multiplier. However, use of high radix recoding has a disadvantage associated therewith which critically impacts the speed of the multiplication. When radix systems greater than two are implemented, special product terms of an operand X, such as 3X, 5X and 7X, must be generated. For example, in U.S. Pat. No. 4,745,570 referenced above, recoders having five inputs for recoding by four bits have special product registers associated therewith to form the special product terms before the recoding additions can be preformed. Therefore, this is a radix five recoding wherein there are four new bits and one overlap bit. The formation of product terms in such special product registers delays the total multiplication time.

Figure 1B:
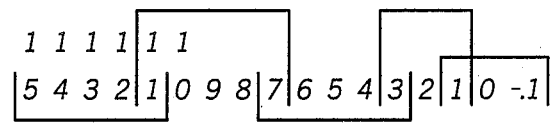
FIG. 1(B) is a graphical representation illustrating bit groupings of a mixed radix recoding algorithm.

Shown in FIG. 1(B) is a graphical representation of a number in binary form which is recoded in accordance with the present invention for use with a known recoding algorithm. However, in the present invention a multiplier utilizing a recoding algorithm having two or more radices is provided. In the illustrated form, two groups of three bits each and three groups of five bits each are known for the same operand bit length as the operand illustrated in FIG. 1(A). The two groups of three bits have a radix of three, and the three groups of five bits have a radix of five. In the context of the present discussion, recoding by two bits is considered to be Booth's recoding algorithm, recoding by three bits is considered to be modified Booth's recoding and recoding by more than three bits is considered to be further modified Booth's algorithm. Again in FIG. 1(B), there is a single bit overlap of the groups; the single bit overlap results from the fact that the highest ranked bit of a group is shifted into a next higher group of bits. From FIG. 1(B) it is not immediately apparent what benefit is provided by utilizing two or more radices in the same recoded multiplier. However, the advantage provided for a high radix multiplier is that the delay previously associated with the carry delay time required to form the special products may be avoided. Therefore, in a multiplier using the mixed radix recoding of FIG. 1(B), the total number of delays or cycles required to perform the multiplication exactly equals the number of recoders. One row of adders is associated with each recoder, and partial products are successively performed by the rows of adders from a least significant to a most significant. Each row of adders, except the last, couples its outputs into a higher ranked row of adders. In contrast, in a single radix multiplier using the radix recoding of FIG. 1(A), the total number of delays or cycles required to perform the multiplication equals the number of recoders plus one. The large amount of delay is due to the fact that the partial product formation must wait for the special product formation.

Figure 2:
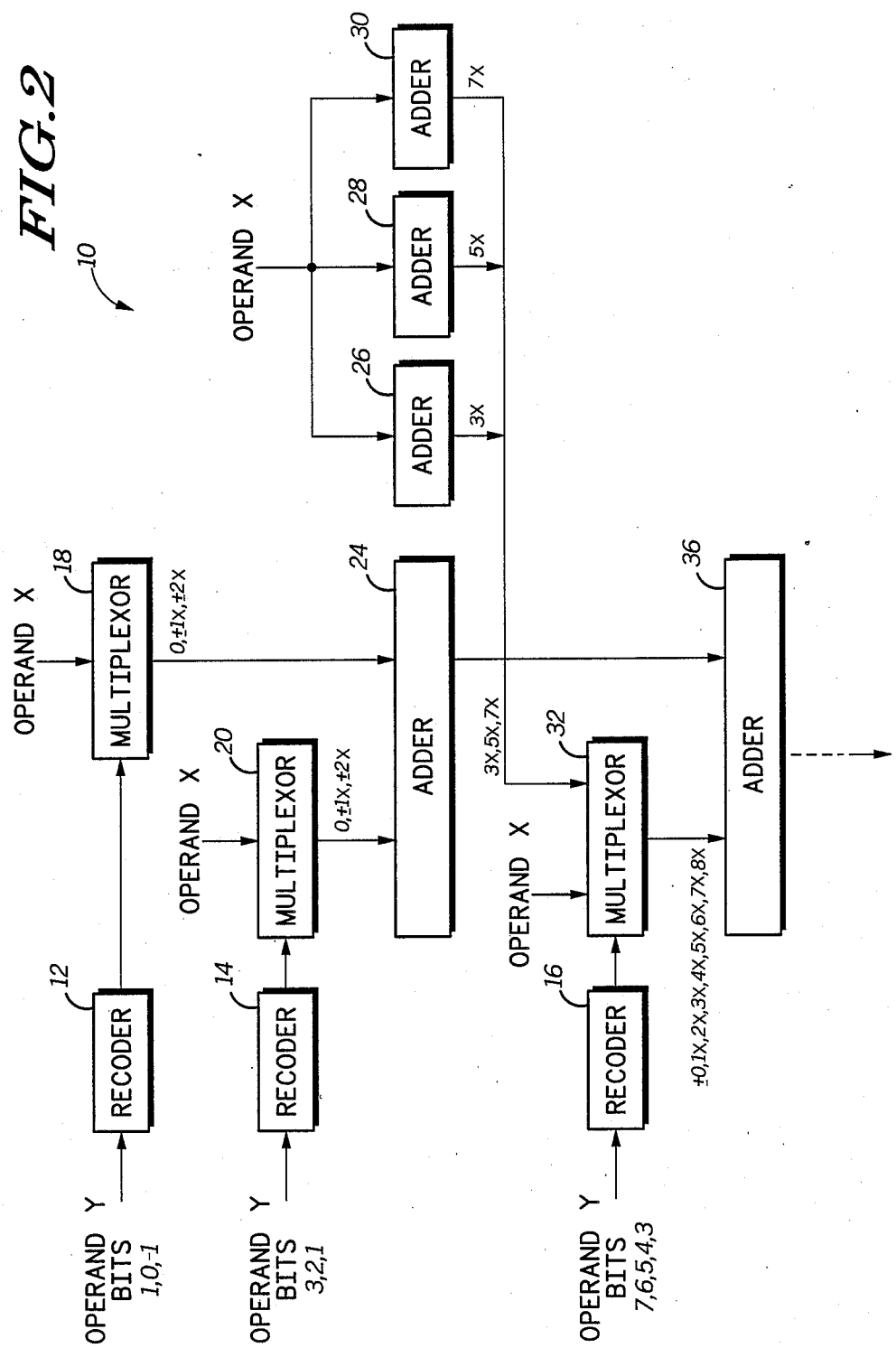
FIG. 2 illustrates in block diagram form a multiplier implementing the mixed length radices of FIG. 1(B).

Shown in FIG. 2 is an example of how a multiplier may be implemented minimizing the number of delays to exactly equal the number of recoders. A multiplier 10 functions to multiply an operand labeled "X" by a second operand, operand "Y", which is recoded by recoders 12, 14 and 16. For purposes of illustration only three recoders are shown. However, it should be apparent that additional recoders may be provided depending upon the operand bit size of the second operand, Y, to function analogous to recoders 12, 14 and/or 16. Recoder 12 receives bits ($-1$), 0 and 1 of the second operand, Y. Recoder 14 receives bits 1, 2 and 3 of the second operand. Recoder 16 receives bits 3, 4, 5, 6, and 7 of the second operand. An output of recoder 12 is connected to a control input of a multiplexor 18. The X operand is connected to a second input of multiplexor 18. An output of recoder 14 is connected to a control input of a multiplexor 20, and the X operand is connected to a second input of multiplexor 20. An output of multiplexor 20 is connected to a first input of an adder 24 which receives one of five possible values (0, plus or minus X, or plus or minus 2X). An output of multiplexor 18 is connected to a second input of adder 24 which receives one of five possible values (0, plus or minus X or plus or minus 2X). The X operand is also connected to an input of each of adders 26, 28 and 30. Adders 26, 28 and 30 add bits of the X operand to respectively provide an output equal to $\pm 3X$, $\pm 5X$ and $\pm 7X$. The output of each of adders 26, 28 and 30 is connected to a first input of a multiplexor 32. A second input of multiplexor 32 is connected to the X operand. An output of recoder 16 is connected to a control input of multiplexor 32. An output of multiplexor 32 is connected to a first input of an adder 36. The output of multiplexor 32 provides the appropriate one of the following X operand factors: $0 \pm 1X$, $\pm 2X$, $\pm 3X$, $\pm 4X$, $\pm 5X$, $\pm 6X$, $\pm 7X$ and $\pm 8X$. The operand factors are added to previous partial products to form a new partial product. An output of adder 24 provides a first partial product term and is connected to a second input of adder 36.

In operation, adders 24 and 36 function to provide partial products. If no other recoders are utilized by multiplier 10, adder 36 provides the final product. Adders 26, 28 and 30 function to form special product terms which are predetermined integer factors of the X operand. The special product terms are required to implement the predetermined recoding algorithm. For purposes of explanation, the recoding algorithm is assumed to be modified Booth's algorithm but it will be readily understood that any recoding algorithm may utilize the method of the present invention. Recoders 12, 14 and 16 of FIG. 2 may be correlated with FIG. 1(B) to understand the unique relationship between formation of special product terms and partial product terms embodied by the present invention. It should be noted that the special product terms are formed in parallel and at the same time as the formation of the first partial product by adder 24. Therefore, a multiplier product formation time is reduced by not having to wait for the formation of the 3X, 5X to 7X special product terms before starting the first addition associated with the partial product term of bits $-1$ to 3. The reason this multiplier cycle is eliminated is associated with the use of differing or mixed radix sizes as compared to the rest of the array in the recoding performed by recoders 12, 14 and 16. Note from FIG. 1(A) that the first recode is a recode of five bits. The present invention divides the first recode into two recodes of three bits each wherein one bit is overlapped as shown in FIG. 1(B). By reducing the first group of recoded bits into a smaller radix, the first recoding can be accomplished before any of the special product terms formed by adders 26, 28 and 30 are required. Therefore, the present invention simultaneously forms the required special product terms while forming the first partial product. The recoding performed by recoders 12 and 14 does not need any of the special product terms provided by adders 26, 28 and 30. Recoder 14 does not require an additional adder row but rather only multiplexor 20 which is a conventional method of avoiding an adder in array multipliers. Therefore, a single addition performed by adder 24 may be implemented at the same time the special product bits are being formed. It should be noted that both multiplexors 18 and 20 must be capable of forming the one's complement of their outputs as well as the normal outputs of 1X and 2X. However, this capability may be readily provided by conventional multiplexor circuits or by passing the sign ($\pm$) information down to adders below in the array.

By now it should be apparent that a method for minimizing delays in a recoded array multiplier has been provided. By utilizing a conventional recoding algorithm wherein two different radices are used, an initial recoding can be performed at the same time that special product terms are being generated for subsequent use with the higher radix recoded values. It should be apparent that two or more radices may be used in implementing the present invention in order to allow simultaneous formation of partial product bits and special product bits. The method taught herein is especially useful in high radix multipliers having a large number of special products which must be formed before partial product calculations could previously have been allowed to proceed. It should be apparent that an accumulation feature may be added to a multiplier utilizing the present invention for multiply/accumulation operations as well as utilizing other known techniques to further enhance operating speed of a multiplier using the present invention. Other uses for mixed radix coding than the ones discussed herein may also be implemented.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. A multiplier using at least two of a plurality of predetermined recoding algorithms and providing a product of first and second input operands, said multiplier recoding a predetermined one of the input operands by using at least two sets of bits of predetermined differing set size to group the predetermined input operand into a plurality of groups of bits, each group of bits having a bit size corresponding to one of first or second set sizes, said multiplier forming special product terms by creating integer multiples of the first operand, said special product terms being required by the multiplier to form partial product terms by using bits associated with the second set size and also forming at least one partial product term by using bits associated with the first set size, said first and second set sizes having differing integer values, said partial product terms being added to provide the product.

2. The multiplier of claim 1 wherein the first set size is less than said second set size.

3. The multiplier of claim 1 wherein one of said predetermined recoding algorithms is Booth's algorithm.

4. The multiplier of claim 1 wherein one of said predetermined recoding algorithms is modified Booth's algorithm.

5. The multiplier of claim 1 wherein said multiplier is an array multiplier having a single row of adders for forming the partial product terms associated with the first set size of the recoded operand, and a rank ordered row of adders for forming partial product terms coupled to each of a predetermined plurality of recoders having the second radix size, said rows of adders successively forming partial product terms beginning with the single row of adders and ending with a highest rank ordered row of adders which are coupled to the recoders having the second set size in order to generate said product of the first and second input operands.

6. The multiplier of claim 1 wherein the first set size is three and the second set size is five.

7. A method of implementing an array multiplier for multiplying two input operands by using two predetermined recoding algorithms, comprising the steps of:
dividing a predetermined one of the two input operands into groups of bits having either a first or a second set size;
coupling each group of bits of the predetermined one of the two input operands into a predetermined one of a plurality of recoders each of which is adapted to recode bits in sets of either the first or second set size to provide a control signal from each recoder;
coupling predetermined integer multiples of a second of the two input operands to each of a plurality of adders as a partial product term for addition with other partial product terms, each control signal selecting an integer multiple value of the predetermined input operand as an input for a predetermined adder; and
successively forming partial product terms with the adders and adding the partial product terms to provide an output product of the two input operands.

8. The method of claim 7 wherein the first set size is three and the second set size is five.

9. The method of claim 8 wherein one of the two predetermined recoding algorithms is Booth's algorithm.

10. The method of claim 7 wherein one of the two predetermined recoding algorithms is modified Booth's algorithm.

11. A recoded multiplier having differing recoding sets of bits for multiplying first and second input operands, comprising:
first recoding means having a first recoding set size for receiving a first portion of the first input operand and recoding said first input operand in accordance with a first predetermined recoding algorithm;
second recoding means having a second recoding set size larger than the first recoding set size and for receiving a second portion of the first input operand and recoding said first input operand in accordance with a second predetermined recoding algorithm;
first logic means coupled to the first recoding means for providing partial product operands in response to the first recoding means;
second logic means coupled to the second recoding means for providing partial product operands in response to the second recoding means;
first adder means coupled to the first and second logic means, said first adder means selectively adding partial product operands provided by the first and second logic means with predetermined multiples of the second input operand to provide an output product; and
second adder means coupled to the first adder means for receiving the second input operand and forming predetermined integer multiples of the second input operand for use by the first adder means while said first recoding means recodes the first portion of the first input operand, thereby optimizing computation time of the multiplier.

12. The recoded multiplier of claim 11 wherein either said first or said second predetermined recoding algorithm is Booth's algorithm.

13. The recoded multiplier of claim 11 wherein either said first or said second predetermined recoding algorithm is modified Booth's algorithm.

14. The recoded multiplier of claim 11 wherein the first recoding set size is three and the second recoding set size is five.

15. The recoded multiplier of claim 11 wherein said second recoding set size is larger than said first recoding set size.

* * * * *